United States Patent [19]

Hudspeth et al.

[11] 3,896,262

[45] July 22, 1975

[54] SUBSCRIPTION TELEVISION JAMMING SYSTEM

[75] Inventors: Thomas Hudspeth, Malibu; Harold A. Rosen, Santa Monica; Bernard L. Walsh, Jr., Northridge, all of Calif.

[73] Assignee: Hughes Aircraft Company, Culver City, Calif.

[22] Filed: Mar. 21, 1974

[21] Appl. No.: 453,223

[52] U.S. Cl. .................................. 178/5.1; 325/132

[51] Int. Cl.$^2$ ........................................... H04N 1/44

[58] Field of Search ...................... 178/5.1, DIG. 13; 179/1.5 S, 1.5 M, 15 BP; 325/308, 309, 392, 132, 475

[56] References Cited

UNITED STATES PATENTS

| | | | |
|---|---|---|---|
| 3,001,011 | 9/1961 | Weiss et al. | 178/5.1 |
| 3,202,758 | 8/1965 | Brownstein | 178/5.1 |
| 3,347,982 | 10/1967 | Bass et al. | 178/5.1 |
| 3,619,782 | 11/1971 | Stokes | 325/308 |
| 3,760,097 | 9/1973 | Burroughs et al. | 325/308 |

*Primary Examiner*—Maynard R. Wilbur
*Assistant Examiner*—T. M. Blum
*Attorney, Agent, or Firm*—W. H. MacAllister, Jr.; D. O. Dennison

[57] ABSTRACT

A system is disclosed for transmitting television signals which can only be intelligibly received by authorized subscribers. At the transmitter end of the system, a CW jamming signal is inserted in the passband of each subscription television program transmitted to subscriber terminals. At each subscriber terminal, a selected subscription program is frequency converted to a predetermined channel. The predetermined channel is applied, along with a CW signal from oscillator circuits, to first and second signal processors to enable them to respectively extract a jamming signal and a jamming signal error, which are representative of the signal from the jamming oscillator. The jamming signal is utilized by the oscillator circuits to aid in the production of its reference and CW signals. The reference signal is converted by a quadrature phase shifter into first and second quadrature reference signals, which are each applied to a quadrature phase detector and a quadrature modulator. The quadrature phase detector develops first and second quadrature DC control signals as a function of a comparison of the jamming signal error signal with each of the quadrature reference signals. In response to the first and second quadrature DC control signals and its other inputs, the quadrature modulator applies a nulling signal to the second signal processor to cause it to substantially cancel the CW jamming signal from the predetermined channel to enable an authorized subscriber to receive same. The system also includes means which disables the operation of the unscrambling circuits when either a free or an unauthorized pay TV program has been selected.

6 Claims, 5 Drawing Figures

PATENTED JUL 22 1975 3,896,262

SHEET 4

SUBSCRIPTION TELEVISION JAMMING SYSTEM

FIELD OF THE INVENTION

This invention relates to secure television systems and particularly to a system for transmitting jammed television programs on subscription television channels which are unintelligible to all television receivers except those having unjamming equipment capable of making the program intelligible when properly authorized.

DESCRIPTION OF THE PRIOR ART

Many different types of subscription television systems have been proposed for transmitting secure television programs which can only be satisfactorily received by authorized subscribers. Some representative types of secure television systems are described in the following paragraphs.

U.S. Pat. No. 3,684,823 illustrates a cable television system which may be used for subscription television programs. In this system a low frequency audio pay TV control signal is modulated onto a carrier and sent over the cable along with video and audio TV program information. At any given subscriber receiver the control signal is used to actuate a circuit which applies a disabling signal to a portion of the receiver. A subscriber, wishing to view the scrambled subscription TV program, must manually switch out the disabling signal and also activate a timing device to record the subscription viewing time. This scheme requires each subscriber to purchase or rent a specially modified television receiver having the required circuitry.

Another suggested subscription television system is described in U.S. Pat. No. 3,478,166. In this system a transmitter produces video signals with the sync component reduced in amplitude to the grey level. Sync signal augmenting pulses are generated in two modes, one true and one false, which are randomly interchangeably transmitted over two transmission channels to enable decoding. At a receiver end of the system an attachment enables an ordinary television receiver, by use of the control signal, to select the proper channel for true augmenting pulses which restore the grey level sync pulses to their normal amplitude.

In other suggested secure subscription television systems a television signal is distributed in coded form for use only in subscriber receivers having appropriate decoding apparatus actuated in accordance with the coding schedule of the telecast. In these systems, coding is accomplished by altering some characteristic of the television signal during spaced intervals which may have a duration corresponding to several field-trace intervals and which may have a time separation also corresponding to one or more field-trace intervals.

Yet another secure subscription television scrambler system utilizes a coder unit at the transmitter end of the system to affect a reversal in the polarity of either the video or sound signals of a subscription TV program. This results in the transmission of a program which cannot be satisfactorily viewed by means of a conventional TV receiver. Each subscriber in the system is furnished with a receiver decoder unit which must be manually set to correspond to the coder unit at the transmitter. When a subscriber wishes to receive a program, he communicates with the transmitting station by telephone, by mail, or in any desirable manner, in order to obtain a key code or switch setting combination which is individual to his receiver for the specific program he desires.

In a further proposed subscription television scrambler two television programs are alternately switched and transmitted over two different channels. By this means each of the channels contains portions of each of the programs at some preselected coded rate. A subscriber authorized to receive one of the programs will receive a preselected coded signal which is utilized to cause the subscriber's converter to selectively switch back and forth between the two transmission channels in synchronism with the switching rate at the transmitter.

In general, prior art secure systems require modification of the sound and/or video signals or selectively mixing two programs on a selected channel to achieve the scrambling effect. Upon unscrambling or decoding the specific change or degradation to the TV signals must be removed or missing signal components added to restore the TV signal to as much of its original quality as possible. This process generally tends to degrade the signal quality in various ways and/or generally adds additional complexity to the unscrambling equipment. Additionally, some of the proposed techniques require the use of subscriber television receivers having extensive internal circuit modifications.

Accordingly, it is an object of the present invention to provide a novel, simple and economical secure subscription television system.

Another object of the present invention is to provide a secure subscription television system requiring a minimal amount of complex and costly subscriber terminal equipment.

It is yet a further object of the present invention to provide a secure television transmission system requiring no internal circuit modifications to the subscriber's television receivers.

Another object of the present invention is to provide unique subscriber terminal equipment for substantially eliminating a CW type jamming signal from a jammed television signal.

Another object of this invention is to provide a secure subscription cable television system which is compatible with either one-way transmission or two-way transmission between the head end and remote subscribers.

SUMMARY OF THE INVENTION

In keeping with the principles of the present invention, applicants have provided a novel system for scrambling or jamming each subscription program to be transmitted from the transmitter end of the system by including within the passband of said program a jamming signal which can only be removed by the equipment of a subscriber who has paid or agreed to pay the required fee for said program. In one embodiment, a signal representative of the jamming signal is extracted and used to phase-lock a VCO control loop to provide a local oscillator signal, which is utilized by a nulling loop along with a second oscillator output to develop a signal of the correct phase, amplitude, and frequency to null out the jamming signal.

BRIEF DESCRIPTION OF THE DRAWINGS

These and other objects, features and advantages of the invention will become more apparent to those skilled in the art in the light of the following detailed description taken in conjunction with the accompanying drawings wherein like reference numerals indicate like or corresponding parts throughout the several views and wherein.

DESCRIPTION OF THE PREFERRED EMBODIMENTS

Figure 1:
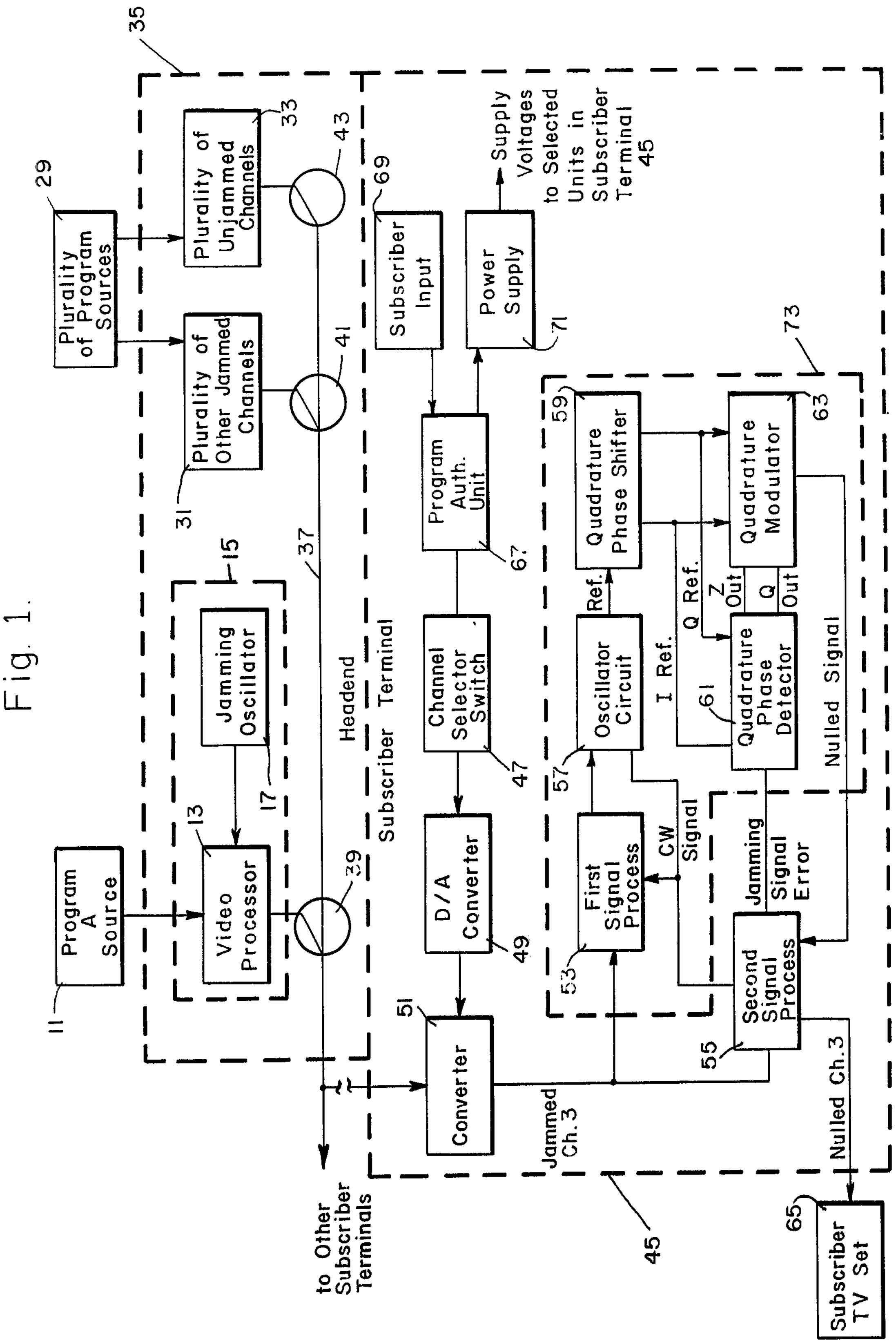
FIG. 1 illustrates a block diagram of a subscription television network which incorporates the invention.

Referring now to the drawings, FIG. 1 illustrates a subscription television network which incorporates the invention. While the invention can be utilized in various forms of television transmission and reception, including over-the-air television, community antenna television, or closed circuit television, all further discussion of the invention will pertain to an exemplary CATV system.

In FIG. 1 program A is applied from a source 11 to a video processor 13 which is contained in a jammed channel X unit 15. Also included in the jammed channel X unit 15 is a jamming oscillator 17 which develops and applies a CW signal to the video processor 13. The output of the video processor 13 is shown in FIG. 2 by the frequency diagram 19.

Figure 2:
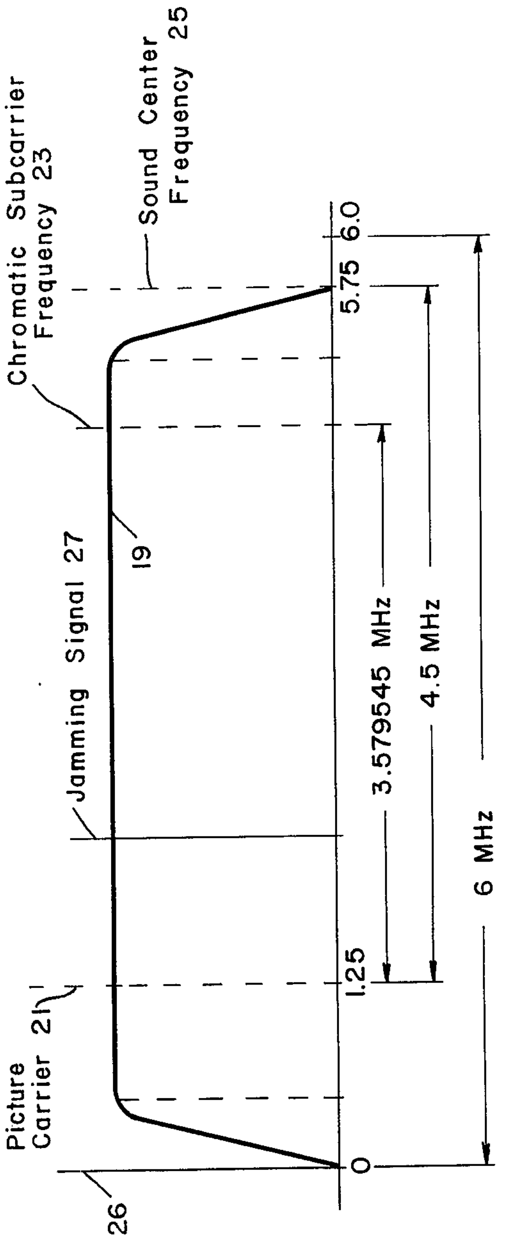
FIG. 2 is a graphical representation of the frequency spectrum of a typical television channel showing the presence of the jamming signal.

The graphical representation of FIG. 2 illustrates the 6 MHz frequency allocation of a standard television channel as defined by the F.C.C. As is well-known, the picture carrier signal 21, chromatic subcarrier frequency 23 and the center of the sound frequency 25 are respectively located at approximately 1.25 MHz, 4.83 MHz and 5.75 MHz above the lower frequency end 26 of the television channel. The jamming oscillator 17 injects a jamming signal 27 into the passband of the television channel X, for example, at a frequency approximately 1 MHz above the picture carrier frequency. The presence of this jamming signal within the passband of the television channel is sufficient to seriously disrupt or render unintelligible the reception of this television channel at subscriber terminals if the level of the jamming signal is within the range from 0 to 10 decibels (db) below the picture carrier 21 level that is transmitted.

Returning to the description of FIG. 1, a plurality of other programs is selectively applied from sources 29 to a plurality of other jammed channels 31, similar to the jammed channel 15, and to a plurality of unjammed channels 33. The outputs of the jammed channel X 15, plurality of other jammed channels 31 and plurality of unjammed channels 33, which are contained within a headend site 35, are respectively frequency multiplexed onto a trunk line 37 via taps 39, 41 and 43 before being transmitted from the headend site 35 to a subscriber terminal 45 and to other subscriber terminals.

Let it be assumed that a subscriber at the subscriber terminal 45 has selected channel X with a channel selector switch 47. The switch 47 produces a digital signal representative of the selected channel X, which is converted into an analog signal by a digital-to-analog (D/A) converter 49 and applied to a voltage controlled converter 51. The converter 51 can include a varactor diode which is responsive to the output from the D/A converter 49 to translate the jammed channel X to, for example, channel 3.

The jammed channel 3 output from the converter 51 is applied to each of first and second signal processors 53 and 55. The first signal processor 53 develops a first output signal representative of the jamming signal 27. This signal is applied to oscillator circuit 57 which, in turn, develops and applies a CW signal to both of the first and second signal processors 53 and 55. The oscillator circuit 57 also develops a reference signal which is applied to a quadrature phase shifter 59 which, in response thereto, develops quadrature signals I Ref. and Q Ref. As contemplated, quadrature phase shifter 59 includes a 90° phase lag circuit to develop the Q Ref. signal which is in phase quadrature to the I (in phase) Ref. signal. The quadrature phase shifter 59 could, in the alternative, utilize two phase shifters, one of which develops a 45° lead signal and the other of which develops a 45° lag signal in order to develop the quadrature signals I Ref. and Q Ref. Furthermore, it should be noted that the invention is not limited to an implementation wherein the signals I Ref. and Q Ref. are in phase quadrature, or 90° out-of-phase, with each other. The system could be implemented utilizing any other fixed phase relationship between I Ref. and Q Ref., with the exception of 0° or 180°.

One output from the second signal processor 55, termed the "jamming signal error" is applied together with I Ref. and Q Ref. as inputs to a quadrature phase detector 61. As will be discussed later, the quadrature phase detector 61 comprises two phase sensitive detectors in which the jamming signal error is phase compared with the phases of the I Ref. and Q Ref. signals from the quadrature phase shifter 59. In response to its inputs the quadrature phase detector 61 develops and applies two resultant phase error signals, I Out and Q Out to a quadrature modulator 63. These resultant phase error signals I Out and Q Out are characterized by amplitudes which are proportional to the amplitude of the jamming signal error and to the cosine of the phase difference between I Ref. and Q Ref. and the jamming signal error, respectively.

In addition to the quadrature output error signals I Out and Q Out from the quadrature phase detector 61, the quadrature modulator 63 also receives the I Ref. and Q Ref. signals from the quadrature phase shifter 59. In general, the quadrature modulator 63 comprises two balanced modulators which operate to control the amplitude and phasing (0° or 180°) of the I Ref. and Q Ref. signals in proportion to the amplitude and sense of the error voltages I Out and Q Out, respectively. The outputs of the balanced modulators contained within the quadrature modulator 63 are summed or added together internally within the quadrature modulator 63 to develop a resultant phase shifted and amplitude controlled CW nulling signal.

This nulling signal from quadrature modulator 63 is applied to the second signal processor 55 to enable the processor 55 to substantially null out the effects from the jamming signal 27 and to develop a nulled channel 3 output which is substantially free of the effects of the jamming signal 27. This nulled channel 3 output from the second signal processor 55 is applied to a TV set 65 of the subscriber to enable him to receive the program that he selected with the switch 47, with the jamming signal 27 substantially eliminated.

In a practical system the subscriber terminal 45 includes means to develop and apply a jammed channel 3 output to the subscriber TV set 65 when the subscriber has not paid or agreed to pay the fee required to receive selected subscription television programs, or when a subscriber is not authorized to receive a restricted television program. A restricted television program is one which is of special interest to a particular group of subscribers. Preferably, the subscriber terminal has the capability of applying the output of the converter 51 to the TV set 65 whenever a free (unjammed) television program is transmitted from the headend 35. Also, a jammed channel is supplied to TV set 65 when the subscriber has not paid or agreed to pay the fee required for receiving the program, or when the subscriber is not authorized to receive a restricted program. These objectives are accomplished by the inclusion of a program authorization unit 67 and a subscriber input 69.

The subscriber input 69, which can be activated by a card, a push button, or other suitable means generates and applies a digital signal to the program authorization unit 67 to indicate that the subscriber has paid or agreed to pay the fee for receiving a selected program, and/or is authorized to receive the program on the selected channel. The program authorization unit 67 can, for example, comprise a comparison unit which compares the digital information from the channel selector switch 47 with the digital information from the subscriber input 69 and generates an enable signal when there is a comparison therebetween. The enable signal generated by the program authorization unit 67 enables, for example, a power supply to supply voltages to selected units in the subscriber terminal 45. For example, when enabled, the power supply 71 could supply operating potentials to a group 73 comprising the units 53, 57, 59, 61 and 63, to enable them to operate normally in removing a jamming signal. It should be obvious that when no enable signal is generated by the program authorization unit 67 the group 73 of components is disabled. As a result, whatever appears at the output of the converter 51, which may either be a free or jammed channel 3, will pass through the second signal processor 55 and be applied to the TV set 65.

Figure 3:
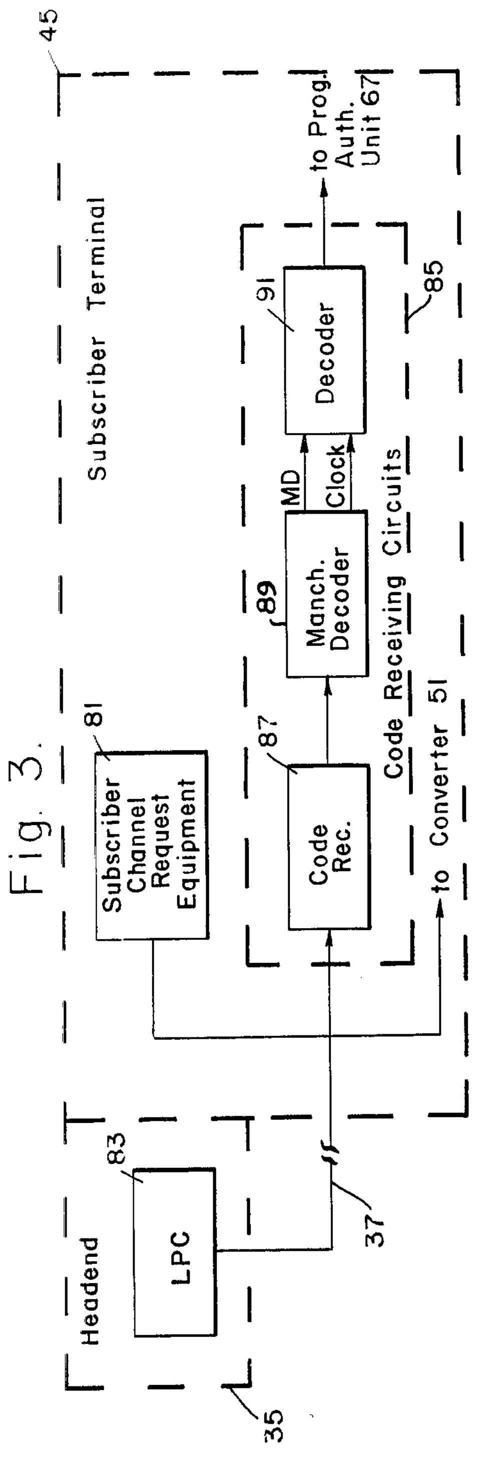
FIG. 3 illustrates, in block diagram, a modification of a portion of the embodiment of FIG. 1.

The system of FIG. 1 can be modified, as shown in FIG. 3, to make it applicable to a two-way CATV operation. In FIG. 3, subscriber channel request equipment 81, further included in the subscriber terminal 45, transmits on a first carrier frequency coded channel request and subscriber terminal address information on the cable 37 to a local processing center (LPC) 83 further included in the headend 35. The LPC 83 records this information for billing purposes for non-restricted subscription programs, but not for free television programs. In the event a restricted program is requested, the LPC 83 searches its memory circuits (not shown) to determine if the subscriber is authorized to receive the restricted program, and records the above information if the subscriber is authorized to receive the program. After receiving a request for a free television program, a non-restricted subscription television program, or an authorized restricted subscription television program, the LPC 83 transmits on a second carrier frequency coded channel enabling and subscriber terminal address information via the cable 37 to code receiving circuits 85 further included in the subscriber terminal 45.

The code receiving circuits 85 can include a code receiver 87 for demodulating the coded channel enabling and subscriber terminal address information, a Manchester decoder 89 for converting the demodulated signal information to Manchester data and clock pulses and a decoder 91 which is responsive to the outputs from the decoder 89 for developing, for example, output channel enabling signal information if the LPC 83 has properly addressed the subscriber terminal 45. The output channel enabling signal information, which may be in digital form, is applied to the program authorization unit 67, along with the previously described signals from the channel selector switch 47 and subscriber input 69. The unit 67 utilizes all of its signal inputs to generate the enable signal in a manner similar to that previously described. A clock (not shown) may be internally included in the program authorization unit 67 to terminate the enable signal at the end of the selected television program and to supply information internally utilized by the unit 67 for the generation of the enable signal. In a different operational mode the LPC 83 could send disabling signal information specifically to the subscriber terminal 45 to disable the decoder 91 at the end of the program.

For one-way operation, the subscriber channel request equipment 81 can be eliminated from FIG. 3 and a clock (not shown) internally included in the program authorization unit 67. In this manner, the program authorization unit 67 could store channel enabling information but not utilize it to generate an enable signal unless the input from the subscriber input 69, the clock timing information and the information from the channel selector switch were utilized to show that an authorized subscriber could receive a selected channel within a predetermined time period.

There are two basic embodiments in which the group 73 and the second signal processor 55 can be implemented to perform the above functions. These two embodiments are discussed in greater detail in connection with FIGS. 4 and 5 below.

Figure 4:
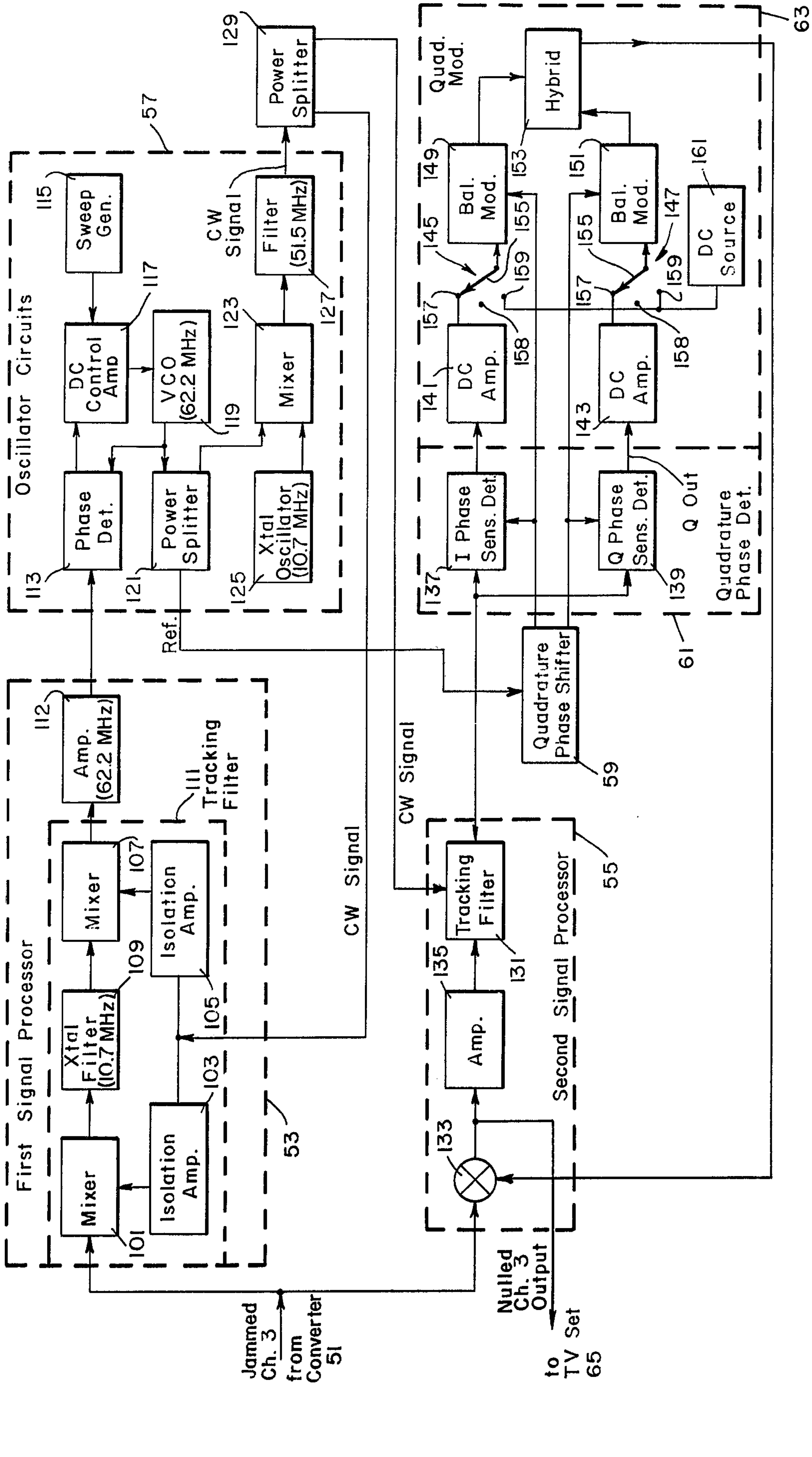
FIG. 4 is a detailed block diagram of a portion of the embodiment of FIG. 1.

Referring now to FIG. 4, the first embodiment of group 73 and second signal processor 55 are illustrated in more detail in block diagram form. Jammed channel 3 from the converter 51 is applied to a mixer 101 in the first signal processor 53. It should be noted that channel 3 extends from 60 to 66 MHz with the jamming signal located at approximately 62.2 MHz. A CW signal at approximately 51.5 MHz is applied through isolation amplifiers 103 and 105 to mixers 101 and 107. The mixer 101 translates channel 3 down to a passband of 8.5 MHz to 14.5 MHz, with the jamming signal now being located at a frequency of 10.7 MHz. The output of mixer 101 is applied to a monolithic crystal filter 109 which has a very narrow bandpass centered about a center frequency of 10.7 MHz. The filter 109 substantially rejects all frequencies within the passband of the mixer 101 output except the jamming signal which it applies to the mixer 107. The mixer 107 translates the output of the filter 109 back to a 62.2 MHz frequency by mixing the CW signal with the output of the crystal filter 109. The circuitry comprising the units 101, 103, 105, 107 and 109 therefore form a tracking filter 111 for recovering the jamming signal from jammed channel 3. The 62.2 MHz jamming signal thus recovered is amplified by an amplifier 112, which is also contained in the first signal processor 53, before it is applied to a phase detector 113 in oscillator circuits 57.

In its initial acquisition mode of operation the oscillator circuits 57 utilizes a sweep generator 115 to supply a sweep voltage to a DC control amplifier 117 to vary the output frequency of a voltage controlled oscillator (VCO) 119. The output of the VCO 119 is applied by way of a power splitter 121 to the quadrature phase shifter 59 and to a mixer 123. The 10.7 MHz output from a crystal oscillator 125 is mixed in the mixer 123 with the VCO 119 output and applied to a narrow band filter 127 which is tuned to 51.5 MHz. As the sweep generator 115 forces the VCO to sweep its output frequency, a 51.5 MHz CW signal is developed by the filter 127 and, as previously indicated, applied through a power splitter 129 to the isolation amplifiers 103 and 105. With the application of a jammed channel 3 output from the converter 51 to the first signal processor 53, the jamming signal at a frequency of 62.2 MHz will be applied to the phase detector and compared with the output from the VCO 119. In this manner the VCO will become phase locked to the 62.2 MHz frequency of the jamming signal. When the jamming signal is first acquired and applied to the phase detector 113 the sweep generator 115 becomes disabled in the conventional manner of phase locked loops and the output of the VCO 119, or reference (Ref.) signal is used to keep the VCO 119 phase locked to the jamming signal. In this manner the oscillator circuits 57 initially causes the jamming signal to be acquired, the VCO 119 to be phase locked thereto, and the 51.5 MHz CW signal to be developed by the mixer 123 and applied through the filter 127 and power splitter 129 to the tracking filter 111 in the first signal processor 53 and to a tracking filter 131 in the second signal processor 55.

The jammed channel 3 from the converter 51 is also applied to a summation point 133 in the second signal processor 55 where it is combined with the nulling signal from the quadrature modulator 63 to develop the nulled channel 3 output which is applied to the TV set 65. The nulled channel 3 output, which contains a residue of the jamming signal, is applied from the summation point 133 through an amplifier 135 to the tracking filter 131. The tracking filter 131 is similar to the tracking filter 111 and operates to recover and apply the jamming signal error to I and Q phase sensitive detectors 137 and 139, respectively, in the quadrature phase detector 61. As discussed previously, the I Ref. and Q Ref. outputs from the quadrature phase shifter 59 are respectively compared in the detectors 137 and 139 with the jamming signal error to develop the I and Q Output error signals.

The I and Q Output error signals from the quadrature phase detector 61 are respectively amplified by DC amplifiers 141 and 143 in the quadrature modulator 63. These DC amplifiers 141 and 143 are included to increase the accuracy of the amplitude control loop so that large corrective action of the output from the quadrature modulator 63 can be actuated by a small jamming signal error from the second signal processor 55. However, to avoid overcorrections, the nulling control loop, comprising the units 55, 59, 61 and 63, should represent a good compromise between accuracy and stability so that any corrective action from the quadrature modulator 63 stops in sufficient time to avoid overcorrections or overshoots from the output from the summation point 133. The amplified error signals I Out and Q Out are respectively applied through switches 145 and 147 to individual ones of two balanced modulators 149 and 151 which operate to produce output signals proportional to the amplitude and sense of the amplified error voltages I Out and Q Out. The outputs of the balanced modulators 149 and 151 are combined in a hybrid network 153 to develop a resultant phase shifted and amplitude controlled CW nulling signal which is applied back to the summation point 133 to substantially null out the CW jamming signal.

Each of the switches 145 and 147 includes a contact arm 155 which can be moved to any one of positions 157, 158, and 159. To improve the nulling out of the jamming signal the quadrature modulator 63 should develop a substantially zero volt nulling signal at the output of the hybrid 153 when both of the switches 145 and 147 are in their opened positions 158. When the contact arm 155 of either of the switches 145 and 147 is placed in its position 159, a DC voltage from a source 161 is applied to the associated one of the balanced modulators 149 and 151 to cause the output of the associated DC amplifier 141 or 143 to develop an output of opposite polarity than that obtained from DC source 161 and at a relatively high gain output. In this manner the output amplitude of each of the DC amplifiers 141 and 143 can be adjusted to provide a compromise between accuracy and stability in the loop, as discussed previously.

Figure 5:
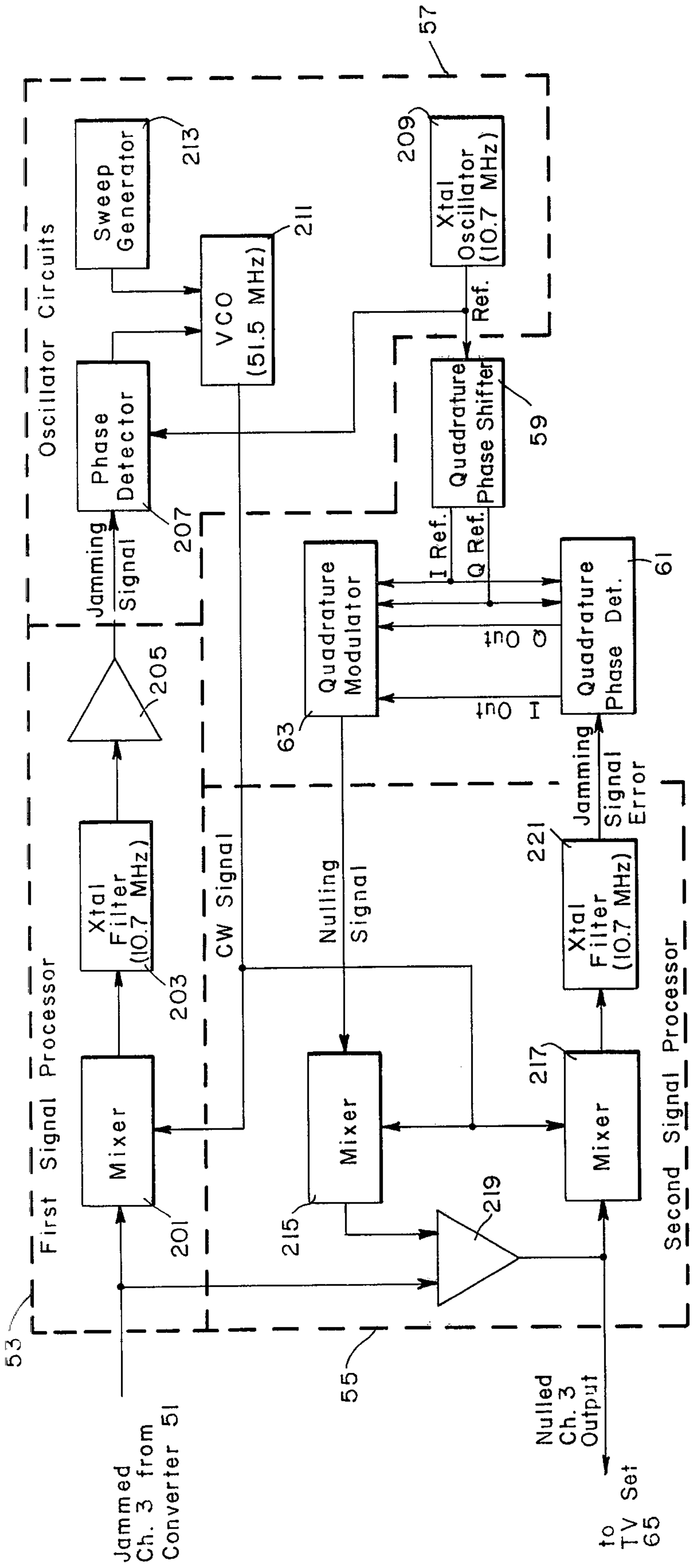
FIG. 5 is a detailed block diagram of an alternative circuit portion useful in practicing the embodiment of FIG. 1.

FIG. 5 illustrates a second embodiment of the group 73 and second signal processor 55 for nulling out the jamming signal. The jammed channel 3 from the converter 51 is mixed with a 51.5 MHz CW signal in a mixer 201 in the first signal processor 53 to translate the jammed channel 3 down to a passband from 8.5 MHz to 14.5 MHz, with the jamming signal being located at 10.7 MHz. The translated signal from the mixer 201 is applied to a narrow band crystal filter 203 which passes to an amplifier 205 only a very narrow band of frequencies having a center frequency of 10.7 MHz.

The output from crystal filter 203, which includes the translated jamming signal is amplified by amplifier 205 and applied to a phase detector 207. The jamming signal is then compared with the reference output from a 10.7 MHz crystal oscillator 209 to develop a control voltage at the output of the phase detector 207. This control voltage causes a VCO 211 to develop the 51.5 MHz signal which is applied to the mixer 201 in the first signal processor 53. The units 201, 203, 205, 207, 209 and 211 form a phase-locked loop which maintains the output of the VCO 211 at a frequency of 51.5 MHz as long as a jammed channel 3 frequency spectrum is applied to the mixer 201. The oscillator circuits 57 utilizes a sweep generator 213 to cause the VCO 211 output to sweep in frequency until the jamming signal is acquired, whereupon the sweep generator 213 is disabled by conventional means, not shown.

The 51.5 MHz CW signal from the VCO 211 is also applied to mixers 215 and 217 in the second signal processor 55. The mixer 215 applies the sum frequency of a 10.7 MHz nulling signal and the 51.5 MHz CW signal to a summing amplifier 219 in the processor 55. The summing amplifier 219 sums the upconverted 62.2

MHz nulling signal with the jammed channel 3 from the converter 51 to develop the nulled channel 3 output which is applied to the TV set 65 and to the mixer 217. The mixer 217 applies the difference frequencies between the 51.5 MHz CW signal and the nulled channel 3 output, which also contains a residue of the jamming signal, to a 10.7 MHz crystal filter 221, similar to the filter 203. The output of the crystal filter 221 in the second signal processor 55 corresponds to the jamming signal error which, in turn, is applied to the quadrature phase detector 61.

The crystal oscillator 209 in oscillator circuits 57 applies its 10.7 MHz reference signal to the quadrature phase shifter 59 to enable the quadrature phase shifter 59 to develop and apply the I Ref. and Q Ref. signals to the quadrature phase detector 61 and quadrature modulator 63. The units 61 and 63 function in a manner similar to that described in relation to FIG. 3, with the exception that the nulling signal at the output of the quadrature modulator 63 is at a frequency of 10.7 MHz. The nulling signal is thereafter translated by the mixer 215 up to the frequency of 62.2 MHz before it is applied to the summing amplifier 219. The frequency translated nulling signal from the mixer 215 is at substantially the same frequency as the jamming signal in the jammed channel 3 spectrum from the converter 51 and has substantially the same amplitude as the jamming signal but is 180° out-of-phase therewith.

The invention thus provides a system wherein a jamming signal is included within the passband of each subscription television program to be transmitted from a central station or headend to a plurality of subscriber terminals. Upon being authorized to receive a selected jammed subscription television program, unscrambling or unjamming circuits in the subscriber terminal are rendered operative. These unjamming circuits remove from the jammed television program a scrambling signal from the jammed television program and utilizes this jamming signal to control the operation of a VCO control loop and a nulling control loop to null out the jamming signal in the jammed subscription program for authorized subscribers.

While the salient features have been illustrated and described in relation to two embodiments, it should be readily apparent to those skilled in the art that modifications can be made within the spirit and scope of the invention as set forth in the appended claims.

What is claimed is:

1. A secure television transmission system comprising, in combination:

at least one source of television program signals, said program signals having at least a video carrier and one video sideband;

at least one source of jamming signals, said jamming signal having a frequency within said video sideband;

means for combining said television program signals and said jamming signal;

means for transmitting said combined signals over an extended transmission path;

means for receiving said transmitted signals, said means including first and second phase-locked loops, said first phase-locked loop being adapted to provide a replica of said jamming signal and said second phase-locked loop being adapted to apply the replica of said jamming signal to said received signals in phase opposition to said jamming signal.

2. The system according to claim 1 wherein said source of jamming signals comprises a continuous wave oscillator.

3. The system according to claim 1 wherein said extended transmission path comprises a cable distribution network.

4. A secure television transmission system of the type having at least one source of program signals, said program signals each including a carrier having video modulation impressed thereon and extending over a given video sideband, at least one source of jamming signals having a frequency within said video sideband, an extended signal transmission path, first means for coupling said program and said jamming signal to said transmission path, at least one subscriber receiver, and second means coupled between said transmission path and said subscriber receiver for substantially eliminating said jamming signal wherein the improvement comprises;

second means which includes a first and second phase-locked loop, said first phase-locked loop being adapted to provide a replica of said jamming signal and said second phase-locked loop being adapted to combine the replica of said jamming signal with said jamming signal in phase opposition.

5. The system according to claim 4 wherein said source of jamming signals comprises a continuous wave oscillator.

6. The system according to claim 4 wherein said extended signal transmission path comprises a cable distribution network.

* * * * *